J. Singer,
Hose Coupling.
N° 26,713.  Patented Jan. 3, 1860.
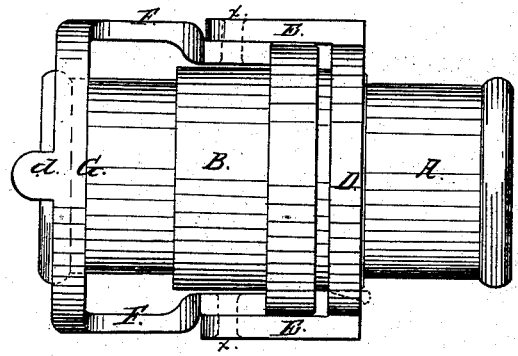
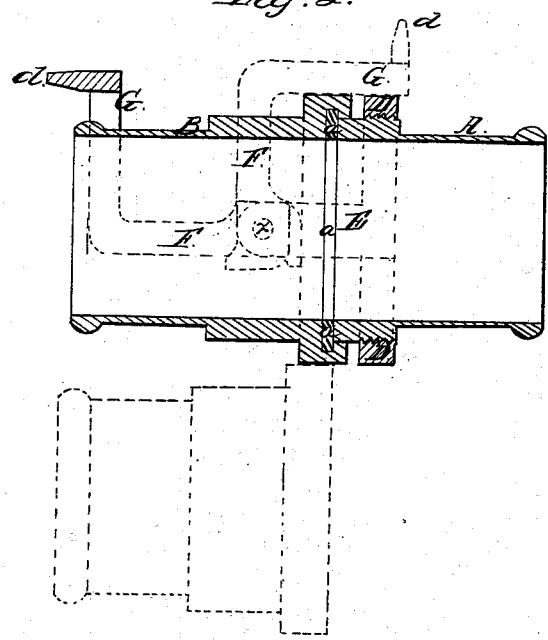
Witnesses:
Ch. S. Boru
John Ingersoll
Inventor:
Joseph Singer

UNITED STATES PATENT OFFICE.

JOSEPH SINGER, OF CLEVELAND, OHIO.

HOSE-COUPLING.

Specification of Letters Patent No. 26,713, dated January 3, 1860.

*To all whom it may concern:*

Be it known that I, JOSEPH SINGER, of Cleveland, county of Cuyahoga, and State of Ohio, have invented a new and useful Improvement in Hose-Couplings; and I do hereby declare that the following is a full, clear, and exact description thereof, reference being had to the accompanying drawings, forming a part of this specification, in which—

Figure 1, represents a top view of my improved hose coupling, with the male and female parts connected and locked securely together. Fig. 2, is a central longitudinal section taken vertically through the coupling when the joint is formed, and lying in the position represented by Fig. 1. The female part of this coupling is represented detached from the male part, and in a position to form a junction of the two.

Similar letters of reference indicate corresponding parts in both figures.

This invention is an improvement in hose-couplings for fire engines and other purposes, the object of which is, to enable the connection and disconnection to be made with a strong head of water flowing through the hose, thus enabling the firemen to make a connection without stopping the engine, which, with the present style of hose-coupling, must be done. In conjunction with the facility of coupling and uncoupling, a perfect joint is formed, and securely locked, so that there will be no liability of the coupling getting accidentally detached by handling. The screw is dispensed with and the couplings can be made cheaper than the present screw couplings, while they are very compact and light. They are not so liable to derangement, and will not be materially affected by snow, ice or sand, which are sometimes very serious evils to the screw coupling.

My invention consists in forming a connection and locking the male and female portions of the coupling together, by peculiarly applied eccentric levers, described and represented as follows.

To enable those skilled in the art, to fully understand my invention, I will proceed to describe its construction and operation.

In the drawings, A, represents the male part and B, the female part of the coupling, the hose being attached to the necks of these by any of the usual methods, the joint of this coupling is very similar to the ordinary pipe-joints, the female part, B, having a flange cast on its end, which forms an annular recess for the reception of a suitable packing, or gasket $a$, and for receiving the end of the male part, A, of the coupling, which end abuts against the packing $a$, when the parts are coupled together.

With the hose coupling now in use, great difficulty is encountered in effecting a junction or coupling, while the water is flowing through the hose, and in the cases where a head of water, force pumps, or fire-engines are employed to force the water, the supply must be shut off above the break in the line of hose. The screw coupling now in general use by the fire department is also objectionable for other reasons, it requires considerable time to "set it up," and complete the joint. The device which I am about to describe will obviate these objections in a very efficient manner. This device consists of a ring of metal D, secured around the male part of the coupling by screws, and diametrically opposite each other, and proceeding out beyond the face of this half of the coupling, are lugs or arms E, E, to the ends of which are pivoted eccentric levers F, F, the longer arms of which are connected together by a semi-circular bar or strip G, having a lug or finger piece $d$ projecting from its crown by which the levers are raised in separating the coupling. The bow or strip G fits pretty close to the surface of the hose when connected, and will not be in the way in handling the hose. The levers have enlargements on their short ends which being pivoted at X X to the arms E, E, eccentrically, they act upon the rear portion of the flange of the female part B, and gradually draw the male coupling up against the packing, and clamp the two halves A, B, securely together and lock them in this situation; the operation being simply to change the position of the levers, from that shown by red lines Fig. 2, to that shown by Figs. 1, and 2, in black lines, and the parts are clamped and locked together. This coupling or clamping device admits of the connection being made only in one direction, and with a "cut off" movement, instead of bringing the two parts up directly opposite each other, as in the present method. In this manner the stream of water can be instantly cut off, or broken, without wetting the person, and without either mallet, hammer or what is commonly used, a "spanner;" and should a section of hose burst, it can be taken out without loss of time, which is all important at a fire, for the loss of five or ten minutes in connecting with the present screw-couplings, undoubtedly has often determined the issue of an extensive conflagration.

The most important feature of my invention is, the manner of tightening up the joint, should it become leaky through constant use; this is effected by cutting screw-threads on the small half of the coupling, corresponding with a thread on the inside of the ring, D, and when the joint becomes loose, the ring may be moved back sufficiently to permit the eccentric arms to act upon the flange of the female half of the coupling, so as to draw the two halves more tightly together.

For making a connection with this improved coupler, the eccentric levers are thrown as far as they will go, shown by red lines Fig. 2; the face of the female coupling is then set fair on the face of the male coupling and slid together with a slight downward pressure, until the female part drops down over the male butt, so that its face will abut against the india rubber packing as in Fig. 2. The eccentric levers are then thrown forward, and depressed as in Figs. 1 and 2 and the parts are forcibly compressed and a perfect water and air tight connection is obtained. The uncoupling is effected as easily as the coupling, the operation requiring only to be reversed.

I do not wish to confine myself to the use of this coupling exclusively to fire-hose, for it will be found applicable and useful for many other purposes; and by employing three eccentric levers, the coupling will be found very serviceable for the suction-pipes of fire-engines; and for many other similar purposes I contemplate using my improved side coupling.

Having thus described the essential features of my invention what I claim, and desire to secure by Letters Patent, is:

The adjustable ring D, arms, E, E, and eccentric levers F, F, in combination with the semi-circular strip G, all applied and operating in the manner and for the purposes herein set forth.

JOSEPH SINGER.

Witnesses:
 CH. P. BORN,
 JOHN INGERSOLL.